United States Patent [19]

Martin

[11] 3,852,522

[45] Dec. 3, 1974

[54] VARIABLE Q IF AMPLIFIER

[75] Inventor: James C. Martin, Fort Wayne, Ind.

[73] Assignee: Warwick Electronics Inc., Chicago, Ill.

[22] Filed: May 21, 1973

[21] Appl. No.: 362,385

[52] U.S. Cl. .................... 178/5.8 R, 178/DIG. 19

[51] Int. Cl. .................................. H04n 5/48

[58] Field of Search ................. 178/DIG. 19, 5.8 R

[56] References Cited

UNITED STATES PATENTS 3,495,031 2/1970 Poppa ..................... 178/DIG. 19

*Primary Examiner*—Richard Murray

*Assistant Examiner*—R. John Godfrey

*Attorney, Agent, or Firm*—Hofgren, Wegner, Allen, Stellman & McCord

[57] ABSTRACT

An Intermediate Frequency amplifier in a television receiver uses a dual gate field-effect transistor with an unbypassed source resistor. The dual gates are connected to a source of composite television signal and to a source of an automatic gain control signal. For weak signal conditions, the automatic gain control signal produces negative voltage feedback across the unbypassed source resistor, varying the output impedance of the field-effect transistor which is in parallel with a tuned circuit. The change in output impedance changes the Q of the tuned circuit and changes the response curve of the Intermediate Frequency amplifier.

8 Claims, 3 Drawing Figures

VARIABLE Q IF AMPLIFIER

BACKGROUND OF THE INVENTION

This invention relates to an Intermediate Frequency amplifier using a field-effect transistor.

In a conventional television receiver, the response curve of the Intermediate Frequency (IF) amplifier is shaped so that the video carrier is located approximately 6dB down the slope of the curve, and the sound carrier is located in a very low amplitude response region. This type of response characteristic insures proper reception and compensates for distortion in the composite television signal which is created by vestigial sideband transmission. When a weak signal is received, the placement of the video carrier may be at too low an amplitude response point on the response curve to produce an acceptable picture. For this reason, viewers often tend to detune the local oscillator of the television receiver, by use of the tuning control, so that the video carrier is placed at the maximum gain point on the IF response curve. However, a shift in the frequency of the video carrier also displaces the sound carrier an equal amount, and may result in locating the sound carrier outside of the IF response curve so that no sound is received.

Various IF stages have been designed to alleviate this problem. In some television receivers, the IF response curve is shaped in such a way that a skirt is developed at the sound end so that when the sound carrier is displaced, it will still be located in the skirt. Physical displacement of the sound and video carriers is known as pole walking.

Another approach is to leave the picture carrier and the sound carrier at their original positions, but to utilize the automatic gain control (AGC) signal to alter the IF response curve when a weak signal is encountered. This achieves a pole walking effect as the poles for the carrier frequencies appear to walk up the sides of the response curve. IF stages using bipolar transistors have been developed to create such a pole walking effect. For example, U.S. Pat. No. 3,495,031 shows an IF amplifier in which the AGC signal varies the output resistance of one bipolar transistor, thereby varying the Q of a tuned circuit included in an interstage network. Such a variable Q IF amplifier is very desirable, but has heretofore been limited to receivers using vacuum tubes or bipolar transistors. It has not been thought possible to provide a variable Q or pole walking effect in an IF amplifier using a field-effect transistor because of the substantially constant input and output impedance generally associated with these devices.

The use of a unipolar or field-effect transistor (FET) in an IF amplifier has been considered desirable because its input and output impedance remains substantially constant with frequency changes. Because of this characteristic, unipolar transistors, such as a high gain dual-gate MOSFET, have been used in plural stage IF amplifiers. For example, a typical first stage IF amplifier using a dual gate MOSFET would couple one gate to the output of the mixer, the other gate to the output of the AGC stage, and the source to a source resistor. Internally, the source would be tied to the case or to the active bulk, which in turn would be shunted to ground through a capacitor, creating in effect a bypassed source resistor. Such a first stage IF amplifier has a substantially constant output impedance.

SUMMARY OF THE INVENTION

In accordance with the present invention, an IF amplifier using a field-effect transistor incorporates variable Q tuning which has heretofore been available only for bipolar transistor circuits. This is accomplished by providing an unbypassed source resistor of particular resistance value. The gate of the field-effect transistor is coupled to an AGC voltage or other voltage which varies in accordance with received signal strength. A change in AGC voltage changes the output resistance of the FET, which is coupled to a single tuned network. Preferably, the field-effect transistor includes a further gate coupled to a source of composite television signal.

One object of the present invention is the provision of a variable Q IF amplifier utilizing a unipolar transistor, such as a field-effect transistor, as the active amplifying device.

Other features and advantages of the invention will be apparent from the following description, and from the drawings. While an illustrative embodiment of the invention will be described herein, it should be understood that the present disclosure is to be considered as an exemplification of the principles of the invention and is not intended to limit the invention to the embodiment illustrated.

DESCRIPTION OF THE PREFERRED EMBODIMENT

Figures 1, 2, 3:
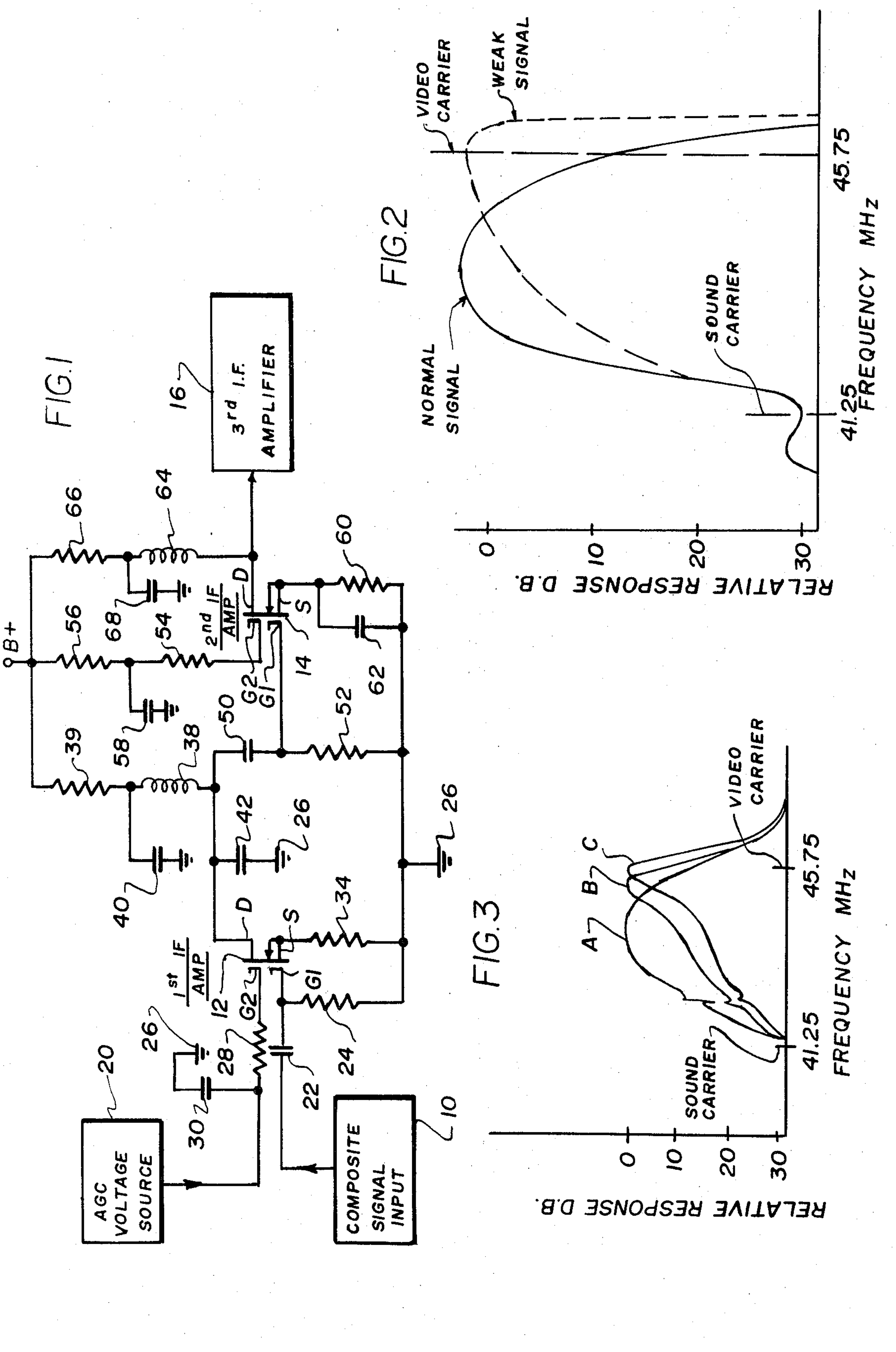
FIG. 1 is a partly block and partly schematic diagram of a variable Q IF channel utilizing field-effect transistors.
FIG. 2 are two idealized response curves of the IF channel, showing the response for a normal input signal and for a weak input signal.
FIG. 3 are three actual response curves of the IF channel for three different values of AGC voltage.

Turning to FIG. 1, an Intermediate Frequency (IF) channel of a television receiver of the intercarrier type is illustrated. The television receiver includes a conventional RF tuner with a variable frequency oscillator and a mixer forming source 10 of composite signal input at the intermediate frequency. The IF composite television signal includes a modulated video carrier located at 45.75 megahertz, and a reduced amplitude frequency modulated sound carrier spaced 4.5 megahertz therefrom, and located at 41.25 megahertz. The IF composite signal is coupled to a three stage IF channel which includes a first IF amplifier using a field-effect transistor or FET 12, a second IF amplifier formed by a FET 14, and a third IF amplifier 16, which also may use a field-effect transistor. The output of the third IF amplifier 16 is coupled to the remaining conventional stages (not illustrated) of the television receiver. The receiver also includes a conventional source 20 of an automatic gain control (AGC) voltage proportional to the amplitude or strength of the received composite television signal.

FET 12 and FET 14 are unipolar semiconductor devices having an operation which is basically a function of only one type of charge carrier, namely, holes in p-channel devices and electrons in n-channel devices. While a reverse-biased semi-conductor junction can be used for the control electrode, the FET devices illustrated use a metal-oxide-semiconductor or MOS gate, in which a metal control gate is separated from the semi-conductor channel by an insulating oxide layer. Preferably, the FET 12 and FET 14 are each a depletion type MOSFET, and may be of the n-channel type. While a dual gate MOSFET is illustrated, it will be apparent that two single gate MOSFETs in cascade could serve the same purpose.

In the first IF amplifier, FET 12 has its G1 gate coupled through a capacitor 22 to the source 10 of composite signal. A resistor 24 bypasses gate G1 to a source of ground 26. The G2 gate is coupled through a resistor 28 to the AGC voltage source 20. A capacitor 30 bypasses one side of resistor 28 to ground 26. The source S of FET 12 is directly connected through an unbypassed source resistor 34 to ground 26. The source resistor is purposely unbypassed, that is, it is not shunted by any reactive impedance, and the resistor 34 may have a value such as 56 ohms. The active bulk of the FET 12 is directly tied to source S. Should the FET which is utilized have a case which is tied internally to the active bulk and thereby to the source S, the case must not be bypassed to ground through a capacitor, for reasons to be explained.

The drain D of FET 12 is coupled to a single tuned coupling network tuned to the frequency of the video carrier, namely 45.75 megahertz. In particular, the drain D is coupled through an inductor 38 and a resistor 39 to a source of positive DC potential, or B+. The junction between inductor 38 and resistor 39 is bypassed to ground through a capacitor 40. A capacitor 42 is coupled between drain D and ground 26. The inductor 38 and capacitor 42 form the single tuned coupling network.

The second IF amplifier is coupled to the first stage by a capacitor 50 which connects the drain D of FET 12 to the G1 gate of FET 14. A damping resistor 52 shunts gate G1 to ground 26, and sets the Q of the tuned coupling network 38,42. The G2 gate of FET 14 is coupled through a resistor 54 and a resistor 56 to B+. The junction between resistor 54 and 56 is shunted to ground through a capacitor 58. The source S of FET 14 includes a source resistor 60 which is bypassed by a capacitor 62. The active bulk of FET 14 is internally connected to the source S.

The drain D of FET 14 is coupled through a tuned circuit including an inductor 64 in series with a resistor 66 which is coupled to B+. A capacitor 68 shunts the junction between resistor 66 and inductor 64 to ground. The drain D is also coupled to the third IF amplifier 16, which may include a MOSFET as its active amplifying device. Two of the three stages of the IF channel are stagger tuned, so that a change in the frequency response of one of the stages will change the overall response characteristic of the channel.

The type of response which can be produced by the variable Q IF amplifier of FIG. 1 is illustrated in FIG. 2. The response curve when receiving a signal of normal signal strength is approximately 6 dB down from the peak response occuring between the video and sound carriers. When a weak signal is received, however, the response curve is desirably modified to achieve a pole walking effect in which the pole or video carrier frequency appears to walk up the side of the response curve. As a result, a distorted response curve is produced for weak signal conditions, as illustrated in dashed lines. The video carrier is placed relatively at a much higher amplitude response point on the dashed line curve. While such an effect has been produced by IF amplifiers using bipolar transistors, the present invention teaches how the response curve of FIG. 2 can be obtained using unipolar transistors.

In particular, the source resistor 34 for the first IF amplifier is selected to be unbypassed. It is known that the output impedance of a MOSFET connected in a common-source configuration, as in FIG. 1, and when using an unbypassed source resistor, is given by the following equation:

$$Z_o = r_{os} + (g_{fs} \times r_{os} + 1)\ R_s$$

Where $r_{os}$ = common-source output resistance $g_{fs}$ = gate-to-drain forward transconductance $R_s$ = total unbypassed source resistance This known property is utilized by the applicant in order to produce a variable Q IF amplifier with a MOSFET. Resistor 34 is unbypassed in order to correspond to $R_s$. Furthermore, the value of the source resistor 34 is altered from the value conventional in MOSFET IF amplifiers using a bypassed source resistor so as to limit the resulting change in output impedance, as too great a change could produce an unstable situation.

As the AGC voltage from source 20 increases in an absolute manner, the AGC voltage at gate G2 produces negative voltage feedback across source resistor 34, proportional to the output current which is porportional to the AGC voltage (and the composite signal). The gate-to-drain forward transconductance $g_{fs}$ varies with the voltage on the insulated gates G, thus varying the output impedance $Z_o$. This change in output impedance changes the Q of single tuned coupling network 38, 42. Since the three IF stages are stagger tuned, the desired change in the IF response curve is achieved.

FIG. 3 illustrates three response curves produced when the circuit of FIG. 1 was constructed and operated for three different values of AGC voltage. Curve A represents the IF response curve produced for an AGC voltage of zero volts. Curve B shows the modified IF response curve produced with an AGC voltage of + 1 volt. Finally, curve C illustrates the IF response curve produced with an AGC voltage of +4 volts.

I claim:

1. In a television receiver including an intermediate frequency amplifier for amplifying a modulated sound carrier and a modulated video carrier, and an automatic gain control stage for generating an AGC signal representative of the strength of a received television signal, the improvement comprising:

a field-effect transistor having a gate, a source, and a drain;

a tuned network coupled to said drain for passing an amplified IF signal;

an unbypassed source resistor coupled to said source for generating negative voltage feedback to vary the output impedance at the drain in response to signal changes at the gate;

composite signal input means for varying the current flow between the drain and source in response to the received television signal; and AGC input means for coupling the AGC signal to said gate to vary the output impedance of said field-effect transistor in response to changes in the AGC signal, whereby changes in the output impedance change the Q of the tuned network.

2. The improvement of claim 1 wherein said field-effect transistor includes a first gate and a second gate each responsive to vary the current flow between said source and drain, said first gate being coupled to said AGC input means, and said composite signal input means couples the received television signal to said second gate.

3. The improvement of claim 2 wherein said field-effect transistor comprises a dual gate, metal-oxide-semi-conductor field-effect transistor.

4. The improvement of claim 1 wherein said tuned network comprises a single tuned network coupled between the drain of said field-effect transistor and a second IF amplifier, said single tuned network being tuned to the frequency of the modulated video carrier.

5. The improvement of claim 4 wherein the field-effect transistor of the first amplifier and the second IF amplifier are stagger tuned to provide an overall response characteristic which peaks in the vicinity of the video carrier for a change in Q produced by a received television signal of weaker strength.

6. The improvement of claim 5 wherein said second IF amplifier includes a field-effect transistor having a gate, a source, and a drain, said gate being coupled to said single tuned network, said drain being coupled to a utilization means, and said source being coupled to a source resistor bypassed by a capacitor.

7. The improvement of claim 1 including a DC potential supply and a ground reference, said unbypassed source resistor being coupled between said source and said ground reference, said tuned network comprises a first reactive impedance coupled between said drain and said DC potential supply and a second reactive impedance in shunt with said field-effect transistor and coupled between said drain and said ground reference.

8. The improvement of claim 7 wherein said first reactive impedance comprises an inductor and said second reactive impedance comprises a capacitor, said inductor and capacitor being tuned approximately to the frequency of one of said modulated carriers.

* * * * *